(12) United States Patent
Huthwohl et al.

(10) Patent No.: US 6,845,611 B2
(45) Date of Patent: Jan. 25, 2005

(54) REDUCING AGENT DOSING DEVICE

(75) Inventors: Georg Huthwohl, Soest (DE); Bernd Maurer, Balve (DE); Frank Noack, Hemer (DE)

(73) Assignee: PUReM Abgassysteme GmbH & Co. KG, Menden (DE)

( * ) Notice: Subject to any disclaimer, the term of this patent is extended or adjusted under 35 U.S.C. 154(b) by 0 days.

(21) Appl. No.: 10/307,592

(22) Filed: Dec. 2, 2002

(65) Prior Publication Data

US 2003/0101714 A1 Jun. 5, 2003

(30) Foreign Application Priority Data

Dec. 3, 2001 (DE) .................................. 201 19 514 U

(51) Int. Cl.$^7$ .............................................. F01N 3/00
(52) U.S. Cl. .......................................... 60/286; 60/280
(58) Field of Search .................... 60/286, 289, 295, 60/300, 280

(56) References Cited

U.S. PATENT DOCUMENTS

| | | | | |
|---|---|---|---|---|
| 5,369,956 A | * | 12/1994 | Daudel et al. | 60/276 |
| 5,419,121 A | * | 5/1995 | Sung et al. | 60/274 |
| 5,544,483 A | * | 8/1996 | Heuer | 60/283 |
| 5,605,042 A | * | 2/1997 | Stutzenberger | 60/286 |
| 5,653,101 A | * | 8/1997 | Lane et al. | 60/274 |
| 5,884,475 A | * | 3/1999 | Hofmann et al. | 60/274 |
| 5,974,789 A | * | 11/1999 | Mathes et al. | 60/274 |
| 6,167,698 B1 | * | 1/2001 | King et al. | 60/286 |
| 6,223,525 B1 | * | 5/2001 | Takanohashi | 60/286 |
| 6,260,353 B1 | * | 7/2001 | Takahashi | 60/286 |
| 6,354,079 B1 | * | 3/2002 | Choi et al. | 60/286 |
| 6,470,673 B1 | * | 10/2002 | van Nieuwstadt et al. | 60/274 |
| 6,526,746 B1 | * | 3/2003 | Wu | 60/286 |
| 6,581,374 B2 | * | 6/2003 | Patchett et al. | 60/286 |

FOREIGN PATENT DOCUMENTS

| | | |
|---|---|---|
| DE | 42 00 514 A1 | 7/1993 |
| DE | 44 32 576 A1 | 3/1996 |
| DE | 195 31 028 A1 | 2/1997 |
| DE | 198 56 366 C1 | 12/1998 |
| DE | 198 00 421 A1 | 7/1999 |
| DE | 199 46 902 | 4/2001 |
| DE | 199 47 198 A1 | 4/2001 |
| DE | 1 316 689 | 4/2003 |
| EP | 0971102 | 12/2000 |
| EP | 02024082.6-2311 | 2/2004 |
| JP | 2000240441 | 5/2000 |

OTHER PUBLICATIONS

Search Report Dated Feb. 23, 2004.
U.S. Appl. No. 10/266,057, filed Oct. 7, 2002, Overhoff et al.
U.S. Appl. No. 10/308,591, filed Dec. 3, 2002, Georg Huthwohl.

\* cited by examiner

*Primary Examiner*—Thomas Denion
*Assistant Examiner*—Diem Tran
(74) *Attorney, Agent, or Firm*—Margaret Polson; Patent Law Offices of Rick Martin, P.C.

(57) ABSTRACT

A reducing agent dosing device for delivering a reducing agent into the exhaust gas system 8 of the internal combustion engine 2 of a motor vehicle, comprising a reducing agent tank 3 connected to the exhaust gas system 8 via a supply line 5, 7 with a dosing valve 6 for delivering a specific quantity of reducing agent. The dosing valve 6 is disposed at a distance from the exhaust gas system 8 in the supply line 5, 7 and the output of the dosing valve 6 terminates in a mixing chamber 7. Compressed air, provided by the charge air of a charging group 10 of the internal combustion engine 2, flows though the mixing chamber in the direction toward the exhaust gas system 8 to mix the reducing agent output with an air stream.

18 Claims, 2 Drawing Sheets

REDUCING AGENT DOSING DEVICE

CROSS REFERENCE APPLICATIONS

This application claims priority from German application no. 201 19 514.3 filed Dec. 3, 2001.

FIELD OF INVENTION

The present invention relates a reducing agent dosing device for delivering a reducing agent into the exhaust gas system of the internal combustion engine of a motor vehicle. The invention has a reducing agent tank connected to the exhaust system via a supply line with a dosing valve for the output of a specific quantity of reducing agent.

BACKGROUND OF THE INVENTION

Apart from carbon monoxide (CO) and hydrocarbons (HC), nitric oxides ($NO_x$) are among the environmentally harmful, directly emitted, primary injurious substances which are generated during the operation of internal combustion engines, in particular diesel engines. The use of three-way catalysts, such as are used in Otto engines and gas engines, cannot be used in the exhaust of diesel engines due to oxygen excess. For this reason, for the reduction of the nitric oxide emission in diesel engines a selectively operating SCR catalyst (Selective Catalytic Reduction Catalyst) has been developed in which, in the presence of an added reducing agent, namely ammonia ($NH_3$), the expelled nitric oxides are reduced to $N_2$ and $H_2O$.

The ammonia required for carrying out the reduction of the nitric oxides can be transported along on board of the motor vehicle in different forms. Pure ammonia in gaseous or in liquid phase can be carried. To avoid problems in handling, the pure ammonia is generally stored in a tank on the motor vehicle in the bound form. The ammonia carried in bound form is hydrolytically split to release the bound ammonia either in the exhaust gas system or previously.

One such reducing agent employed is an aqueous solution of urea. The urea solution is stored in a reducing agent tank and is connected with the exhaust gas system of the internal combustion engine via a supply line. A dosing valve disposed on the exhaust gas system serves to deliver the required quantity of urea that is immediately gasified due to the temperatures obtained in the exhaust gas system. The gasification releases the ammonia required for carrying out the nitric oxide reduction.

Due to the disposition of the dosing valve immediately on the exhaust gas system, the input side of the dosing valve must be cooled to prevent the liquid urea solution decomposing or crystallizing out due to the high temperatures. Such reducing agent dosing devices are known in the art, for example from DE 198 56 366 C1.

According to a further known implementation the dosing valve is disposed directly beneath the reducing agent tank and is connected with the exhaust gas system over a delivery line that is several meters long. Compressed air from the air compressor for the brake system transports the quantity of urea solution in the delivery line. The dosed urea solution quantity is, therefore, transported in the supply line as an aerosol. However, the problem with this implementation is that the several meter long supply line, which carries the aerosolized reducing agent, can have a relatively small diameter due to the quantity of air which can be branched off from the air compressors. Therefore, in this implementation a fundamental hazard is reducing agent precipitating out of the aerosol onto the walls of the supply line, crystallizing on the walls and impairing or eliminating the through flow capability.

There are disadvantages of using a reducing agent dosing device which delivers liquid reducing agent into the exhaust gas system and which has the dosing valve positioned directly on the exhaust gas system, as described in DE 198 56 366 C1. One disadvantage is that the termination opening of the dosing valve must be oriented so that the reducing agent jet output dose output is parallel to the direction of flow of the exhaust gas. This prevents the delivered jet of reducing agent contacting one of the encompassing walls of the exhaust gas system and crystallizing on these sites. This would reduce the flow cross-section of the exhaust gas pipe and may even cause an obstruction. For this reason it is necessary to set a dosing valve, such as described in DE 198 56 366 C1, into an exhaust gas system elbow. This is not always possible. In particular it is not desirable to introduce a corresponding curvature into the exhaust gas system solely for the positioning of the dosing valve.

Building on this discussed prior art, the present invention addresses the problem of developing an above described reducing agent dosing device such that effective reducing agent dosing into the exhaust gas system of an internal combustion engine is possible without having to tolerate the previously demonstrated disadvantages in prior art.

This problem is solved according to the present invention by having the dosing valve spaced from the exhaust gas system in the supply line connecting the reducing agent tank with the exhaust gas system. The output of the dosing valve ends in a mixing chamber through which, during operation of the internal combustion engine, flows compressed air in the direction to the exhaust gas system, mixing the reducing agent delivered by the dosing valve with an air stream. The compressed air is provided by the charge air of a charging group of the internal combustion engine

SUMMARY OF THE INVENTION

The primary aspect of the present invention is to provide a reducing agent dosing device that reduces the disadvantages of the prior art.

Other aspects of this invention will appear from the following description and appended claims, reference being made to the accompanying drawings forming a part of this specification wherein like reference characters designate corresponding parts in the several views.

In contrast to prior art, the reducing agent dosing device according to the present invention is not located directly on the exhaust gas system but rather spaced apart from it. Therefore, the dosing valve does not need to be cooled. The dosing valve terminates in a mixing chamber acted upon by compressed air, which, in turn, ends in the exhaust gas system. The output dose of reducing agent becomes mixed in the mixing chamber with the provided compressed air and is aerosolized. This aerosol can be introduced directly into the exhaust gas system. In this case, the injection of the reducing agent aerosol ensures that the hazard of reducing agent precipitations on the inner walls of the exhaust gas system is avoided. Consequently, using this implementation the mixing chamber can end into the exhaust gas system at any site preceding the SCR catalyst.

Providing an aerosol in the mixing chamber has a further advantage that due to the larger surface area the urea is more readily hydrolytically split. For this reason, one embodiment of the invention provides developing the mixing chamber as a mixing pipe, which is connected to a heat exchanger. The heat exchanger then terminates at the output side in the exhaust gas system. The heat exchanger is heated by the heat of the exhaust gas flowing in the exhaust gas system. The operative exhaust gas temperature is sufficiently high to hydrolytically split the aqueous urea solution used as reducing agent, causing splitting in the reducing agent aerosol disposed in the heat exchanger. Subsequently, the reducing agent (here: ammonia) is introduced in the gaseous form into the exhaust gas system. For this purpose the heat exchanger is connected with the exhaust gas system by means of a delivery line.

The mixing chamber is acted upon by compressed air provided by the charge air of a charging group of the internal combustion engine, for example a compressor or a turbocharger. Employing the compressed air as the transport medium for the aerosolized urea quantity has the advantage that the quantity of air required is very small in comparison to the quantity of air provided by a turbocharger. Therefore, this branching-off of air is without effect on the specified operation of the turbocharger. In particular, in the case of using the charge air of a turbocharger, it is possible to acquire the charge air before or after the charge-air cooler, so that air of different temperatures is available for mixing. In this way it is possible to preheat the provided aerosol.

The diameter of the mixing chamber, which can be developed as a mixing pipe, is usefully greater than the diameter of the supply line connected at the input side on the dosing valve. The dosing valve is usefully disposed in the immediate proximity of the internal combustion engine. One advantage of this is that the dosing valve, in particular during operation of the internal combustion engine at low temperatures, is heated by the engine heat. Another advantage of this disposition is the dosing valve can be disposed in the immediate proximity of the charge-air cooler so that the branch acting upon the mixing chamber has only a short extension.

As a rule, the reducing agent tank for storing the reducing agent is located in the immediate proximity of the fuel tank. Modern internal combustion engines also have a fuel return line extending from the internal combustion engine to the fuel tank. By placing the dosing valve in the immediate proximity of the internal combustion engine, it is possible to put the supply line extending between the dosing valve and the reducing agent tank, at least largely in a heat-conducting contact to the fuel return line.

The heat contained in the fuel return line, which during operation of the internal combustion engine as a rule does not exceed 60–70° C., can be utilized for heating this supply line. Therefore the course of the supply line is usefully disposed parallel to the fuel return line, and both lines can be combined. For example in a double tube or as a double-walled tube with two channels disposed concentrically with respect to one another. Consequently the expenditure for adequate heating of the supply line is reduced to a minimum. In particular, no additional regulation of the heat is required since the decomposition temperature of urea in aqueous form is not exceeded at any time in the supply line. Another advantage is that in this manner cooling of the fuel transported back in the fuel return line takes place. This prevents having to use further cooling measures for cooling the returning fuel. The required heat in the fuel return line is already available after an extremely short operating time of the internal combustion engine. In particular the heat is available substantially earlier than when using cooling water, which would have be heated through the operation of the engine.

Since the fuel return line extends from the fuel tank to the internal combustion engine it is easy to heat substantially the entire supply line between the reducing agent tank and the dosing valve, which is in near the exhaust gas system.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
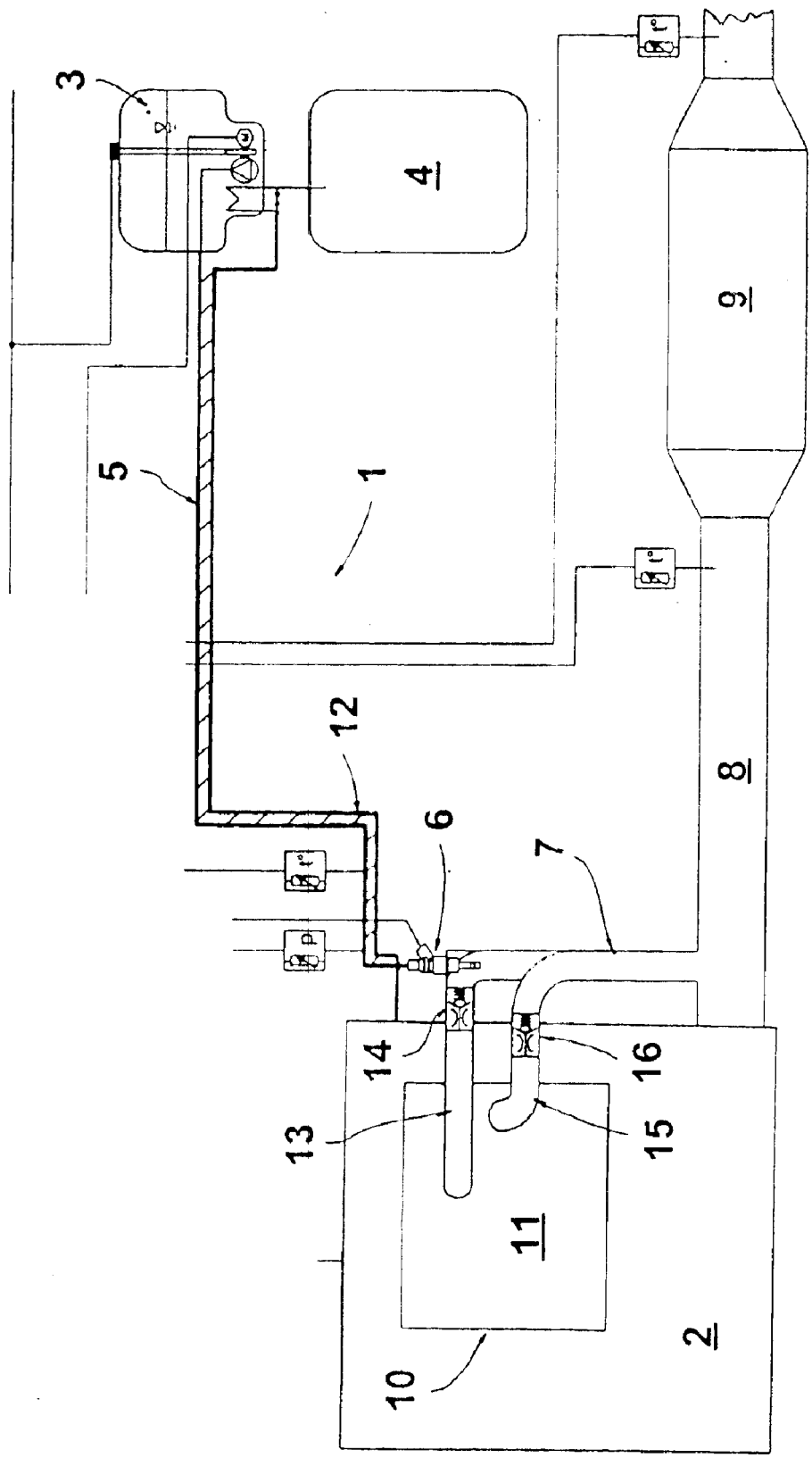
FIG. 1 is a block diagram of one embodiment of a reducing agent dosing device of the present invention.

Referring first to FIG. 1, a reducing agent dosing device, identified overall with the reference number 1, for delivering urea into the exhaust system of a diesel engine 2 comprises a reducing agent tank 3, is disposed adjacent to the fuel tank 4, which stores the fuel required for operating the internal combustion engine 2. The reducing agent tank 3 is connected by a supply line 5 to a dosing valve 6. The dosing valve 6 is associated with the internal combustion engine 2, which, in the depicted embodiment example, is a diesel engine. The output side the dosing valve 6 extends into a mixing chamber 7 which terminates in the exhaust gas system 8 of the internal combustion engine 2. The termination of the mixing chamber 7 in the exhaust gas system 8 is located in front of an SCR catalyst 9. Consequently, in the depicted embodiment example the supply line connecting the reducing agent tank 3 with the exhaust gas system 8 is formed by the supply line 5 and the mixing chamber 7.

In the depicted embodiment example the mixing chamber 7 is supplied with compressed air by charge air of a turbocharger 10 associated with the internal combustion engine 2. The quantity of the reducing agent output by the dosing valve 6 is therefore transported in mixing chamber 7 as an aerosol and introduced as such into the exhaust gas system 8. The compressed air to be delivered to the mixing chamber 7 can, as depicted in FIG. 1, be removed before and/or after the charge-air cooler 11. So that the aerosolized reducing agent transported in the mixing chamber 7 is brought to the appropriate temperature before it enters the exhaust gas system 8.

A fuel return line 12 is disposed between the internal combustion engine 2 and the fuel tank 4. The fuel transported back in the fuel return line 12 from the internal combustion engine 2 to the fuel tank 4 has a temperature of between 50 and 70° C. after an extremely short operating time of the internal combustion engine. The supply line 5, in heat-conducting connection with the fuel return line 12, is provided for delivering the reducing agent from the reducing agent tank 3 to the dosing valve 6. The section of the supply line 5 that is in heat-conducting connection with the fuel return line 12 is depicted in hatched form in FIG. 1. The representation shows clearly that substantially all of supply line 5 is heat-conductingly connected with the fuel return line 12. The heat-conducting connection between the two lines 5, 12 can be formed by a double-tube with two channels running parallel to one another. The two lines can be connected to one another by a web, or they can also be realized by single lines connected by a joining connection.

The dosing valve 6 extends at the mouth side into the mixing chamber 7 and projects the output into the mixing chamber 7. The mixing chamber 7 has a markedly greater diameter than the diameter of the supply line 5 at the input side of the dosing valve 6. A first charge airline 13, which taps the compressed air behind the charge-air cooler 11, terminates in the mixing chamber 7. A one-way choke restrictor 14 separates the charge-air line 13 from the mixing chamber 7.

The dosing valve 6 is set in a curvature region of the mixing chamber 7 so that the reducing agent dose is output in the direction of flow of the compressed-air action. The dosing valve 6 extending into the mixing chamber 7 has the advantage that the output liquid reducing agent jet is located directly in the charge-air flow and thus favors the formation of an aerosol. A second charge-air line 15 terminates mixing chamber 7 which taps charge air made available by the turbocharger 10 at a site preceding the charge-air cooler 11. The charge air line 15 is also separated against the mixing chamber 7 proper via a one-way choke restrictor 16. The two chokes 14, 16, are additionally developed in the depicted embodiment example as check valves. This allows pressure balance for compensation of the pressure loss caused by the charge-air cooler. In a further implementation not shown in the Figures, the previously described one-way restrictors can be electrically drivable in order to be able to meet certain operating conditions in this manner.

Employing charge air is not only advantageous because air compressor provides a sufficient quantity of air to generate in a sufficient air flow the mixing chamber 7, but also because the air compressors can be developed with variable blade geometry. Utilizing such an air compressor makes also possible, through different blade positions, providing the air quantity required in each instance for the specified operation of the reducing agent dosing device 1.

Tapping the charge air before the charge-air cooler 11 has the advantage that the reducing agent aerosol provided in the mixing chamber 7 is already preheated and thus the temperature difference between the aerosol and the exhaust gas flowing in the exhaust gas system 8 is lower, which supports the hydrolysis of the reducing agent in the exhaust gas system 8.

Due to the offset disposition of the dosing valve 6 relative to the exhaust gas system 8, separated by mixing chamber 7, the dosing valve 6 does not require cooling as is necessary with known prior art.

In a useful embodiment the dosing valve 6 and the mixing chamber 7 are a portion of the suction pipe of the charging group, for example of turbocharger 10. A reduction of the parts required for carrying out the invention is therefore provided.

Figure 2:
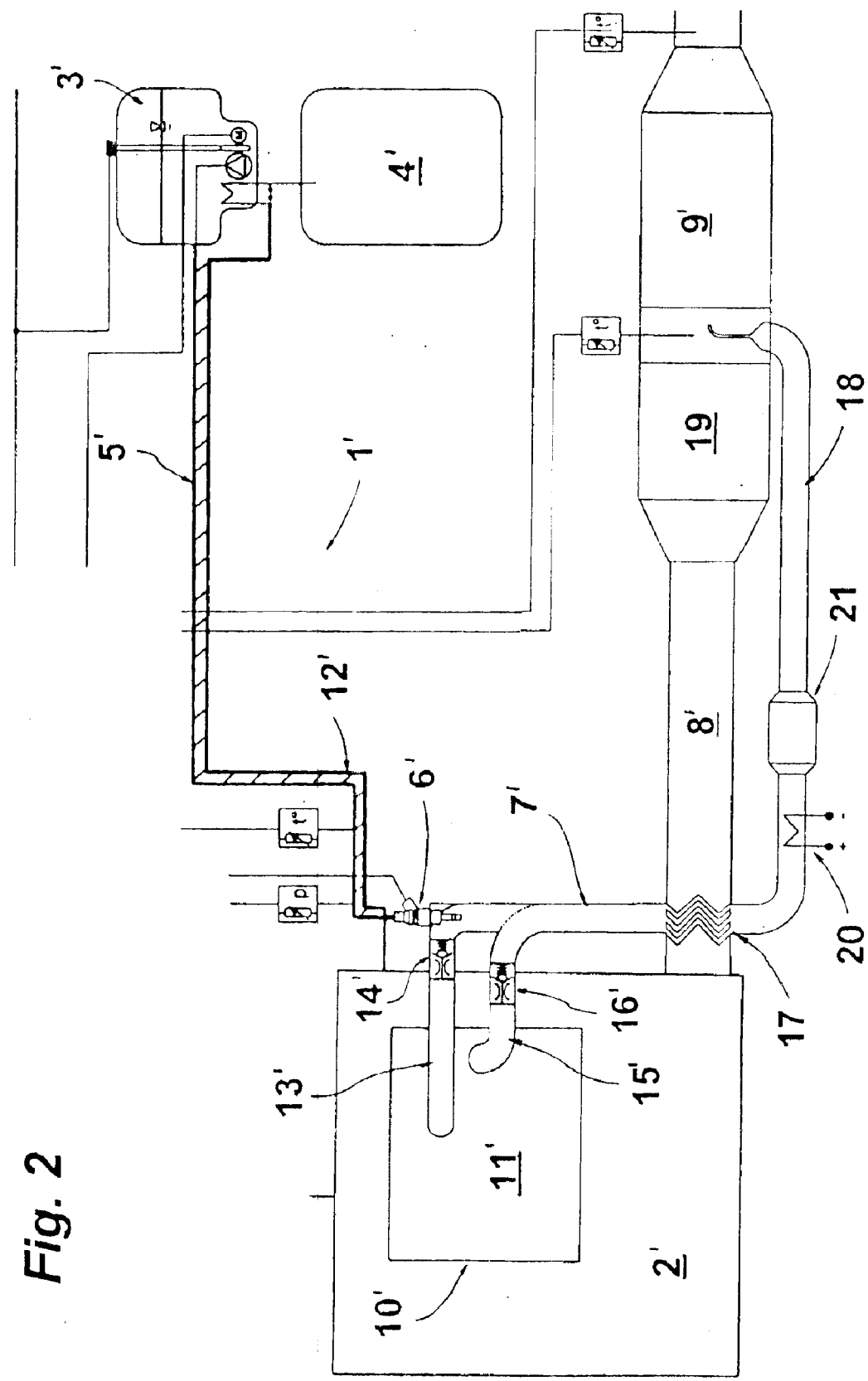
FIG. 2 is a block diagram of a second embodiment of a reducing agent dosing device of the present invention.

FIG. 2 shows a further reducing agent dosing device, which fundamentally is structured like the reducing agent dosing device of FIG. 1. This is identified in FIG. 2 by the reference symbol 1'. For the remainder, the same elements are identified by the same reference symbols to which is added an apostrophe ['].

In contrast to the reducing agent dosing device 1 as depicted in FIG. 1, the mixing chamber 7' of the reducing agent dosing device 1' of FIG. 2 does not terminate directly in the exhaust gas train 8', but rather the aerosol formed in mixing chamber 7' flows initially through a heat exchanger 17. The heat exchanger 17 is disposed in the exhaust gas system 8 in order to transfer the exhaust gas heat contained in the exhaust gas of the exhaust gas system 8' onto the reducing agent aerosol. In the heat exchanger 17 a hydrolytic decomposition of the reducing agent aerosol takes place. This is because during operation of the internal combustion engine the exhaust gas temperature is, as a rule, higher than the decomposition temperature of the reducing agent aerosol. The heat exchanger 17 is connected via a delivery line 18 with the exhaust gas system 8' and terminates in the latter before the SCR catalyst 9' and after an oxidation catalyst 19. Set into the delivery line 18 is further a heating element 20 and a hydrolysis catalyst 21 for supporting the hydrolytic splitting of the reducing agent utilized or of the reducing agent aerosol. In particular, in the case of a cold start of the internal combustion engine in which the exhaust gas temperature is still below the decomposition temperature of the employed aerosol, the heating element 20 and the hydrolysis catalyst 21 succeeding the heating element 20 provide the desired gaseous reducing agent. As a function of the operating state and the obtaining temperatures, in particular in the exhaust gas system 8', mixed operation for the hydrolytic splitting of the reducing agent aerosol is also possible.

The reducing agent dosing devices 1, 1' are each driven via an engine management system not further shown, so that according to the particular engine state the required reducing agent quantity is delivered or the hydrolytic splitting is controlled.

By the term reducing agents employed within the scope of these explanations are to be understood such which are either the reducing agent itself or which comprise it as a component. This is the case for example when using an aqueous urea solution in which the ammonia component represents the reducing agent proper.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

| List of Reference Numbers | |
| --- | --- |
| 1, 1' | Reducing agent dosing device |
| 2, 2' | Internal combustion engine |
| 3, 3' | Reducing agent tank |
| 4, 4' | Fuel |
| 5, 5' | Supply line |
| 6, 6' | Dosing valve |
| 7, 7' | Delivery line |
| 8, 8' | Exhaust gas system |
| 9, 9' | SCR catalyst |
| 10, 10' | Turbocharger |
| 11. 11' | Charge-air cooler |
| 12, 12' | Fuel return line |
| 13 | Charge-air line |
| 14 | One-way restrictor |
| 15 | Charge-air line |
| 16 | One-way restrictor |
| 17 | Heat exchanger |
| 18 | Delivery line |
| 19 | Oxidation catalyst |
| 20 | Heating element |
| 21 | Hydrolysis catalyst |

We claim:

1. A reducing agent dosing device for delivering a reducing agent into an exhaust gas system of an internal combustion engine of a motor vehicle comprising:

a reducing agent tank;

a dosing valve for the output of a specific quantity of reducing agent having an input side and an output side;

a supply line connecting the reducing agent tank with the dosing valve;

the output of the dosing valve terminates in a mixing chamber, said mixing chamber being connected to the exhaust gas system;

compressed air flowing through the mixing chamber in the direction to the exhaust gas system; said compressed air being provided by the charge air of a turbocharger of the internal combustion engine for mixing the reducing agent output by the dosing valve with an air flow; and wherein the mixing chamber is alternatively supplied with compressed air at a first temperature by a first compressed air line attached to the charge air before a charge-air cooler and compressed air at a second temperature being lower the first temperature by a second compressed air line attached to the charge air after the charge air cooler.

2. A reducing agent dosing device for delivering a reducing agent into an exhaust gas system of an internal combustion engine of a motor vehicle comprising:

a reducing agent tank;

a dosing valve for the output of a specific quantity of reducing agent having an input side and an output side;

a supply line connecting the reducing agent tank with the dosing valve;

the output of the dosing valve terminates in a mixing chamber, said mixing chamber being connected to the exhaust gas system;

compressed air flowing through the mixing chamber in the direction to the exhaust gas system; said compressed air being provide by the charge air of a charging group of the internal combustion engine for mixing the reducing agent output by the dosing valve with an air flow; and wherein the supply line is disposed in heat-conducting connection with fuel return line extending from the internal combustion engine to a fuel tank, functioning to heat the supply line.

3. The reducing agent dosing device as claimed in one of claim 1 or 2, wherein the diameter of the mixing chamber is greater than the diameter of the supply line at the input side of the dosing valve.

4. The reducing agent dosing device as claimed in claim 1 or 2, wherein the dosing valve is disposed in the immediate proximity of the internal combustion engine.

5. The reducing agent dosing device as claimed in claim 1, wherein in each compressed air line further comprises a one one-way choke restrictor.

6. The reducing agent dosing device as claimed in one of claims 1 and 2, wherein the dosing valve is disposed such that the dose of the reducing agent output by the dosing valve is delivered in the direction of the longitudinal extension of the mixing chamber.

7. Reducing agent dosing device as claimed in claim 4, wherein the dosing valve is disposed such that the dose of the reducing agent output by the dosing valve is delivered in the direction of the longitudinal extension of the mixing chamber.

8. Reducing agent dosing device as claimed in claim 1, wherein the dosing valve is disposed such that the dose of the reducing agent output by the dosing valve is delivered in the direction of the longitudinal extension of the mixing chamber.

9. Reducing agent dosing device as claimed in claim 5, wherein the dosing valve is disposed such that the dose of the reducing agent output by the dosing valve is delivered in the direction of the longitudinal extension of the mixing chamber.

10. The reducing agent dosing device as claimed in one of claim 1 or 2, wherein the output side of the dosing valve projects into the mixing chamber.

11. The reducing agent dosing device as claimed in claim 7, wherein the output side of the dosing valve projects into the mixing chamber.

12. The reducing agent dosing device as claimed in claim 8, wherein the output side of the dosing valve projects into the mixing chamber.

13. The reducing agent dosing device as claimed in claim 9, wherein the output side of the dosing valve projects into the mixing chamber.

14. The reducing agent dosing device as claimed in one of claim 1 or 2, wherein the mixing chamber is a mixing pipe.

15. The reducing agent dosing device as claimed in claim 1 or 2, further comprising:

a heat exchanger disposed in the exhaust gas system connected to the mixing chamber, said exchanger functioning to transfer heat from the exhaust gas flowing in the exhaust gas system to the reducing agent aerosol in the mixing chamber or in the heat exchanger, respectively;

the heat exchanger terminating at an output side in a delivery line for the transport of the heated, if appropriate hydrolytically split, reducing agent into the exhaust gas system.

16. Reducing agent dosing device as claimed in claim 15, wherein a heating element is interconnected in the delivery line, functioning to heat the delivery line.

17. The reducing agent dosing device as claimed in claim 3, wherein the supply line is disposed in heat-conducting connection with a fuel return line extending from the internal combustion engine to a fuel tank, functioning to heat the supply line.

18. The reducing agent dosing device as claimed in one of claim 1 or 2, wherein the reducing agent is an aqueous urea solution.

* * * * *